Dec. 23, 1958 J. F. TOWLER 2,865,990
TELEVISION RECEIVER REMOTE CONTROL SYSTEM
Filed Oct. 8, 1953
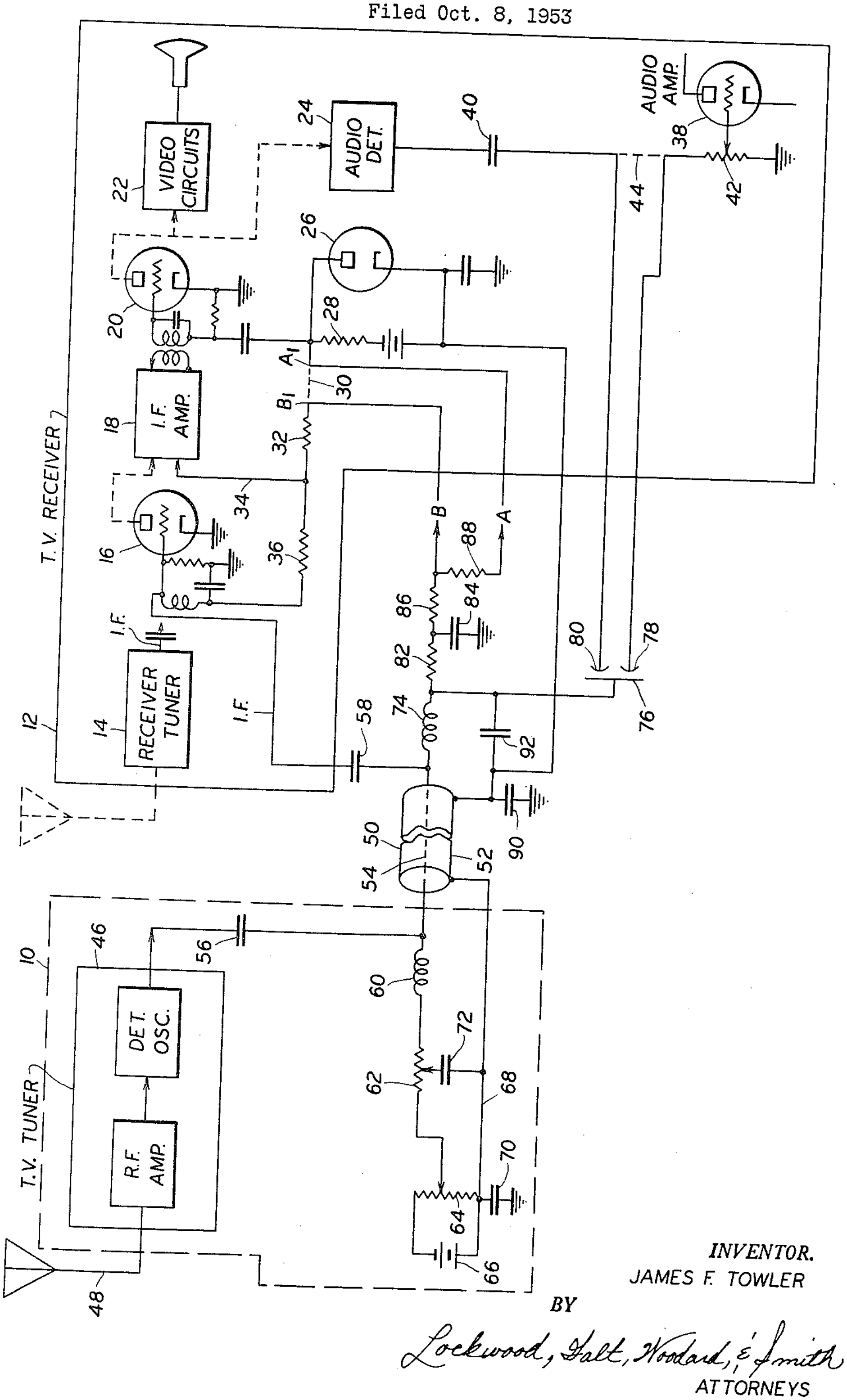
INVENTOR.
JAMES F. TOWLER
BY
Lockwood, Galt, Woodard, & Smith
ATTORNEYS United States Patent Office 2,865,990

Patented Dec. 23, 1958

2,865,990

TELEVISION RECEIVER REMOTE CONTROL SYSTEM

James F. Towler, Indianapolis, Ind., assignor to I. D. E. A. Inc., Indianapolis, Ind.

Application October 8, 1953, Serial No. 384,855

5 Claims. (Cl. 178—7.3)

The present invention relates to manual operation of television receivers, and more particularly to a system for controlling station selection, audio level and video quality of a television picture from a location remote to the receiver.

By reason of the fact that normal viewing of a picture on the display screen of the usual television receiver occurs at a remote point from the receiver, it is both logical and convenient that adjustment of the television tuning controls be effected from such point. As a matter of fact, as the sizes of receiver display screens increase, proper tuning at the receiver becomes increasingly difficult because of the reduced picture definition per unit of screen area. For example, it is much easier to adjust the quality of a picture displayed on a screen of seven inches diameter from a viewing point immediately adjacent thereto than it is to adjust the picture on a twenty-one inch screen from the same viewing point. It is customary practice, in operating the larger type screens, to make an adjustment at the receiver then back off a suitable distance and observe the picture, then return to the receiver and make an incremental corrective adjustment, this being repeated until a suitable picture is obtained. This, of course, is inconvenient as well as undesirable, since it actually may be impossible to make an optimum adjustment by this repeated observation-correction method owing to the fact that the observer has no method of comparing instantaneously one adjustment with another.

By controlling station selection, picture quality and audio volume from a remote location, optimum conditions obtain for both convenient and comparative adjustment of the receiver. Various systems of remote control have been proposed, but none have been adopted by industry for the reason that the equipment involved has been too complex and expensive as well as difficult to install. For the home viewer, acceptable remote control systems must be the ultimate in simplicity, economical to purchase and efficient in operation. Moreover, in order for such a remote system to be adapted to existing installations, it is necessary that a minimum of changes in the usual television receivers be required for keeping labor and material costs to a minimum.

In view of the foregoing, it is an object of this invention to provide a remote control system for television receivers whereby station selection, audio level and picture contract quality of the receiver from a remote point may be controlled.

It is another object of this invention to provide a remote control device for controlling the operation of a television receiver, which is simple in construction and operation, and requires a minimum number of connections between the device and the television receiver.

It is another object of this invention to provide a remote control system for television receivers, which embodies three separate control devices for station selection, audio volume, and picture contrast.

It is still another object of this invention to provide in addition to the foregoing object an arrangement for conducting the signals from the three controlling devices to the television receiver, which is the ultimate in simplicity.

Other objects will become apparent as the description proceeds.

To the accomplishment of the above and related objects, my invention may be embodied in the forms illustrated in the accompanying drawings, attention being called to the fact, however, that the drawings are illustrative only, and that specific changes may be made in the specific constructions illustrated and described, so long as the scope of the appended claims is not violated.

The drawing is a combination block and circuit diagram of one embodiment of this invention.

It will be appreciated that in order to achieve a suitable remote control system commercially acceptable for distribution and sale to current television receiver owners, it is necessary that such system be readily acceptable, without complication, to almost all existing commercial receiver designs. Included in this, it is also necessary that a minimum size and number of connections be required between the remote control point and the receiver proper for overcoming the usual objections of unsightly wires running underneath rugs, around walls and the like, and the usual high cost attendant with the use of multi-conductor cables. As will appear in the following, the present invention meets these requirements, and in addition does not noticeably interfere with proper receiver operation as previously provided by the manufacturer.

Referring to the drawings, the remote control unit which is located at a point distant from the receiver itself is indicated by the dashed line block 10. The television receiver is contained within the solid line block 12 and is of conventional design. This receiver includes the usual well-known circuits such as the tuner 14, I. F. amplifiers 16, 18 and 20, and the video and audio circuits 22 and 24, respectively. The tuner 14 usually comprises a radio frequency amplifier and a detector-oscillator circuit for converting received television signals into an intermediate frequency signal which is fed to the usual amplifiers 16, 18, 20 for amplification and distribution to the usual video and audio circuits.

Automatic gain control systems in television receivers are conventionally provided, but differ somewhat in design and operation as between different receivers. For example, one well known television receiver utilizes the usual diode rectifier circuit for providing automatic gain control of the I. F. amplifiers, whereas others use the well-known keyed A. G. C. system which likewise supplies a gain control voltage for the I. F. amplifiers. As will appear in the following, regardless of the type of automatic gain control utilized in the receiver, the present invention may be easily and readily adapted thereto.

The automatic gain control system illustrated in the drawing is of the diode rectifier type in which the amplified composite television signal is coupled to the anode of a diode rectifier 26 and to one end of a resistor-bias battery combination indicated by the reference numeral 28. During the positive excursion of the composite signal, the diode 26 is caused to conduct thereby causing a current to flow through the bias-developing network 28 and by proper selection of circuit parameters and voltages, the rectified voltage developed at the anode of the diode 26 can be made to vary inversely with signal amplitude changes in the intermediate frequency amplifier signal thereby to provide a voltage for leveling the gain of the latter. This voltage is usually of negative polarity and is applied to the control grid of the intermediate frequency amplifier. In the diagram, this voltage is conducted by line 30, resistance 32 and wire 34 to the intermediate frequency amplifier stage 18, and further to the stage 16 by means of a coupling resistor 36. This particular method of feeding the automatic gain voltage to the intermediate frequency amplifier is illustrated as an example of the conventional method of controlling the first two stages of a cascaded series of amplifier stages in an intermediate frequency amplifier system, but it will be understood by persons skilled in the art that such control voltage may effectively stabilize the amplifier gain by application to either the first or second stage or some other stage in the amplifier system.

The receiver audio system is illustrated as originating with the audio detector 24 which provides a detected signal coupled to the usual amplifier 38 by means of coupling condenser 40. Audio volume is controlled by means of the usual variable resistor 42 which is grounded at one end and connected to the coupling capacitor 40 by means of a wire 44. Thus by varying the arm on the control 42, the amplitude of the audio signal fed to the grid of the amplifier 38 may be controlled.

In adapting the invention to the television receiver just described, the receiver tuner 14 is disconnected from the intermediate frequency amplifier 16 as shown. Effectively, the remote control device 10 is substituted for this receiver tuner 14 for the purpose of providing the necessary intermediate frequency signal for utilization by the remaining circuits of the receiver.

The device 10 is comprised of the usual T. V. tuner 46 which may be identical to the receiver tuner 14. The receiver antenna 48 is suitably coupled thereto.

The only conductive connection between the remote control device 10 and the television receiver is a single conductor coaxial line 50 having an outer sheath conductor 52 and an inner wire conductor 54. The output signal from the tuner 46 is coupled to the center conductor 54 by means of a coupling condenser 56, and another coupling condenser 58 extending from the remote end of the conductor 54 serves to couple the signal to the control grid of the receiver amplifier 16. These condensers 56 and 58 are so selected as to present a relatively low impedance to the television signal but a high impedance to audio and direct current signals.

To the junction of the condenser 56 and the cable conductor 54 is connected an inductor 60 having an impedance which is high at the frequency of the video signal but low at audio and D. C. frequencies. A volume control in the form of a variable resistor 62 is connected between this inductor 60 and the variable arm of another variable resistor 64. This last resistor constitutes the television receiver picture contrast control and is supplied across its ends with a bias voltage from a battery 66. The line 68 which is connected to the lower end of the resistor 64 is connected to tuner 10 ground through the condenser 70 and extends to the outer sheath 52 of the cable 50. A by-pass condenser 72 extends between the variable arm of the volume control 62 and the ground line 68.

At the other end of the cable 50, the audio circuit is comprised of an inductor 74, which may be identical to the inductor 60, and a series connected condenser 76 preferably having two plates 78 and 80 for providing effectively two condensers connected in series. The audio line 44 of the receiver audio system is broken as indicated by the dashed line and the free ends are connected to the plates 78 and 80, respectively, of this condenser 76. By this arrangement, the condenser 76 is effectively connected in a series with the audio coupling condenser 40 for supplying audio signal voltage to the control grid of the amplifier 38.

A picture contrast control path includes the inductor 74 and an audio frequency filtering circuit. This filtering circuit is comprised of a resistor 82 and a suitable condenser 84, the resistor 82 extending from the inductor 74 with the opposite end being grounded as shown through the condenser 84. Another resistor 86 for use in adapting this remote control system to a television receiver utilizing keyed automatic gain control is connected in series with the resistor 82 and also in series with a suitable isolating resistor 88. In connecting this picture contrast control circuit into the television receiver, two leads A and B are extended from the opposite ends, respectively, of the resistor 88 to the respective ends A1 and B1 of line 30 which is broken as indicated by the dashed line. Thus, the automatic gain control circuit of the receiver effectively includes the resistor 88.

From the foregoing it will now be apparent that a total of three controlled signals are conducted to the receiver by means of a single wire cable 50. The operation of the system in accomplishing this single wire conduction will now be explained.

*Intermediate frequency picture signal*

As previously explained, the inductor 60 presents such a high impedance to the picture signal coupled to the line 54 over the capacitor 56 that the signal is isolated from the circuitry appearing on the left side of this inductor. The signal is conducted, via the cable 50 to the condenser 58 and onto the control grid of the intermediate frequency amplifier where it is utilized in the usual manner for providing both video and audio information. The inductor 74 presents such a high impedance to this picture signal that it effectively isolates the circuitry appearing on the right-hand side of the inductor. Thus, the picture signal path or channel is constituted by and limited to the condenser 56, cable 50, and condenser 58.

*Audio volume control channel*

The audio channel includes a potentiometer 62, the variable arm of which is effectively grounded through capacitor 72, thereby being connected in shunt with the receiver volume control 42. The audio path includes the capacitor 76, inductor 74, the cable 50, inductor 60, potentiometer 62, condenser 72, and capacitor 90. The two condensers 56 and 58 are of such high impedance as to prevent the audio signal from entering the control grid circuit of the intermediate frequency amplifier 16. In operation, the audio signal derived from the receiver audio detector 24 is coupled through the condenser 76, inductor 74, conductor 54, and inductor 60 to the volume control 62, from which the return path passes over condenser 72, line 68, cable sheath 52, and receiver ground through the condenser 90. By adjustment of the variable arm of the volume control 62, the amplitude of the audio signal applied to the control grid of the receiver amplifier 38 is varied thereby achieving control of the receiver volume.

*Picture contrast control*

The channel over which picture contrast is controlled includes the variable resistor 64, resistor 62, inductor 60, center conductor 54, inductor 74, audio filter 82, 84, resistor 86 and resistor 88, the return path to the contrast control 64 being through the receiver ground circuit which terminates in cable shield 52 and wire 68. In operation, D. C. bias voltage as supplied by the battery 66 is applied over the variable arm of the contrast control 64 to the cable 50 from which it is conducted over the inductor 74 and resistors 82, 86 and 88 into the bias voltage circuit of the automatic gain control system of the receiver. Effectively, this bias voltage so supplied is superimposed upon the normal automatic gain control voltage and serves to raise or lower the operating point of the I. F. amplifier as needed to control the gain thereof. Thus, by adding negative bias to the automatic gain control system through operation of the contrast control 64, the gain of the intermediate frequency amplifier is lowered thereby reducing picture contrast. Reverse operation of the contrast control 64 serves to increase the gain of the intermediate frequency amplifier and to thereby increase picture contrast.

The filtering network 82 and 84 is so designed as to isolate the automatic gain control circuit from the audio voltage appearing on the inductor 74 so as to prevent modulation of the bias line to the I. F. amplifiers.

*Summary*

From the foregoing, it will now be apparent that the invention accomplishes, from a remote location, effective operation of the receiver in the selection of stations, adjustment of picture contrast, and adjustment of audio volume. By reason of the various unique signal isolation features, each of these three operations may be effected individually without interference with the operation effected by the other adjustments. Coupled with this normal and convenient receiver control is the fact that installation of the remote control arrangement is the ultimate in simplicity and requires only a single conductor cable of no more than a quarter of an inch in diameter between the control unit and the receiver, the installation at the receiver being correspondingly simple and capable of accomplishment by persons having a minimum of skill and experience in the art.

While it will be understood that the circuit specifications of the remote control system of this invention may vary according to the design for any given application, the following circuit specifications for such a system are included, by way of example, as suitable for use in connection with almost all television receivers of current commercial design.

| | | |
|---|---|---|
| Condenser 56 | mmf | 100 |
| Condenser 58 | mmf | 100 |
| Inductor 60 | mh | 10 to 20 |
| Resistor 62 | ohms | 250,000 |
| Resistor 64 | do | 100,000 |
| Battery 66 | volts | 100 |
| Condenser 70 | mfd | 0.01 |
| Condenser 72 | mfd | 1.0 |
| Inductor 74 | mh | 10 to 20 |
| Condenser 78 | mfd | 0.02 |
| Condenser 80 | mfd | 0.02 |
| Resistor 82 | megohms | 1 |
| Condenser 84 | mfd | 0.1 |
| Resistor 86 | ohms | 330,000 |
| Condenser 88 | do | 470,000 |
| Condenser 90 | mfd | 10 |
| Condenser 92 | mmf | 100 |

What is claimed is:

1. A system for controlling the operation of a television receiver having an intermediate frequency amplifier which includes a first gain control electrode and an audio gain amplifier which includes a second gain control electrode, comprising a remote control device, said device including a converter for producing an intermediate frequency signal, and an audio volume control means, a coupling network interconnecting said converter and volume control means with said intermediate frequency amplifier and said audio gain amplifier respectively, said network including a two-conductor line, said line being directly coupled at one end to said converter and at the other end to said intermediate frequency amplifier gain control electrode whereby the signal of said converter is utilized by said intermediate frequency amplifier, said volume control being coupled to said one line end through an isolating network comprising means which presents a high impedance to the converter signal but a low impedance to audio signals, a filtering network coupled between said other line end and said second gain control electrode, said filtering network presenting a high impedance to the converter signal but a low impedance to the audio signal, and variable biasing means coupled to said one line end by means of said isolating network for controlling the amplification of said intermediate frequency amplifier.

2. A system for controlling the operation of a television receiver having an intermediate frequency amplifier which includes a first gain control electrode and an audio gain amplifier which includes a second gain control electrode, comprising a remote control device, said device including a converter for producing an intermediate frequency signal and an audio volume control, a coupling network interconnecting said converter and volume control means with said said intermediate frequency amplifier and said audio gain amplifier respectively, said network including a two-conductor line, said line having two ends, one end being operatively coupled to said converter and said volume control respectively, a first isolating circuit interposed between said volume control and said converter and comprising means for preventing the signal from the volume control from being coupled into the converter and the converter signals from being coupled into the volume control, the other line end being operatively coupled to said intermediate frequency amplifier gain control electrode and to said audio amplifier, a second isolating circuit interposed between said intermediate frequency amplifier and said audio amplifier, said second isolating circuit comprising means restricting the coupling of the converter signal from said line to said intermediate frequency amplifier only and also restricting the coupling of the volume control signal from said line to said audio amplifier only, and a contrast control included in said remote control device and being operatively coupled to said line to vary a fixed potential thereon, said fixed potential constituting the bias for said intermediate frequency amplifier.

3. A system for controlling the operation of a television receiver having an intermediate frequency amplifier which includes a first gain control electrode and an audio gain amplifier which includes a second gain control electrode, comprising a remote control device, said device including a converter for producing an intermediate frequency signal and an audio volume control, a coupling network interconnecting said converter and volume control means with said intermediate frequency amplifier and said audio gain amplifier respectively, said network including a two-conductor line, said line having two ends, one end being operatively coupled to said converter and said volume control respectively, a first isolating circuit interposed between said volume control and said converter and comprising means for preventing the signal from the volume control from being coupled into the converter and the converter signals from being coupled into the volume control, the other line end being operatively coupled to said intermediate frequency amplifier gain control electrode and to said audio amplifier gain control electrode, a second isolating circuit interposed between said intermediate frequency amplifier and said audio amplifier, said second isolating circuit comprising means restricting the coupling of the converter signal from said line to said intermediate frequency amplifier only and also restricting the coupling of the volume control signal from said line to said audio amplifier only, and a source of variable unidirectional potential coupled in shunt with said volume control for controlling the amplification of said intermediate frequency amplifier.

4. A system for controlling the operation of a television receiver having an intermediate frequency amplifier which includes a first gain control electrode and an audio gain amplifier which includes a second gain control electrode, comprising a remote control device, said device including a converter for producing an intermediate frequency signal and an audio volume control, a coupling network interconnecting said converter and volume control means with said intermediate frequency amplifier and said audio gain amplifier respectively, said network including a two-conductor line, said line having two ends, one end being operatively coupled to said converter and said volume control respectively, a first isolating circuit interposed between said volume control and said converter and comprising means for preventing the signal from the volume control from being coupled into the converter and the converter signals from being coupled into the volume control; said isolating circuit including a capacitor connected between said line and said converter, said capacitor presenting a high impedance to audio signals but a low impedance to converter signals, and an inductor connected between said line and said volume control presenting a high impedance to converter signals but a low impedance to audio signals; the other line end being operatively coupled to said intermediate frequency amplifier gain control electrode and to said audio amplifier, a second isolating circuit interposed between said intermediate frequency amplifier and said audio amplifier, said second isolating circuit comprising means restricting the coupling of the converter signal from said line to said intermediate frequency amplifier only and also restricting the coupling of the volume control signal from said line to said audio amplifier only; said second isolating circuit including a second capacitor connected between said line and said intermediate frequency amplifier, said second capacitor presenting a low impedance to converter signals and a high impedance to audio signals, and a second inductor connected between said audio amplifier and said line, said second inductor presenting a high impedance to converter signals and a low impedance to audio signals, and a source of variable unidirectional potential coupled in shunt with said volume control for controlling the amplification of said intermediate frequency amplifier.

5. A system for controlling the operation of a television receiver having an intermediate frequency amplifier which includes a first gain control electrode and an audio gain amplifier which includes a second gain control electrode, comprising a remote control device, said device including a converter for producing an intermediate frequency signal and an audio volume control, a coupling network interconnecting said converter and volume control means with said intermediate frequency amplifier and said audio gain amplifier respectively, said network including a two-conductor line, said line having two ends, one end being operatively coupled to said converter and said volume control respectively, a first isolating circuit interposed between said volume control and said converter and comprising means for preventing the signal from the volume control from being coupled into the converter and the converter signals from being coupled into the volume control; said isolating circuit including a capacitor connected between said line and said converter, said capacitor presenting a high impedance to audio signals but a low impedance to converter signals, and an inductor connected between said line and said volume control presenting a high impedance to converter signals but a low impedance to audio signals; the other line end being operatively coupled to said intermediate frequency amplifier and to said audio amplifier, a second isolating circuit interposed between said intermediate frequency amplifier and said audio amplifier, said second isolating circuit comprising means restricting the coupling of the converter signal from said line to said intermediate frequency amplifier only and also restricting the coupling of the volume control signal from said line to said audio amplifier only; said second isolating circuit including a second capacitor connected between said line and said intermediate frequency amplifier gain control electrode, said second capacitor presenting a low impedance to converter signals and a high impedance to audio signals, and a series connected inductor and capacitor connected between said audio amplifier gain control electrode and said line and presenting a high impedance to converter signals but a low impedance to audio signals, a conductive connection between said line and said first gain control electrode; and a variable source of bias voltage for said first gain control electrode included in said remote control device, said source being coupled in shunt with said volume control.

References Cited in the file of this patent

UNITED STATES PATENTS

| | | |
|---|---|---|
| 2,056,011 | Lowell | Sept. 29, 1936 |
| 2,394,917 | Kallmann | Feb. 12, 1946 |
| 2,498,691 | Macalpine | Feb. 28, 1950 |

OTHER REFERENCES

Television Distribution Over Short Wire Lines; Journal of the British Institute of Radio Engineers, March 1949, pages 89–94.

Rider's Television Manual, vol. 8, Multiple TV, page 8–1, Copyrighted November 26, 1951.